United States Patent
Lu et al.

(10) Patent No.: US 10,117,282 B2
(45) Date of Patent: Oct. 30, 2018

(54) D2D DEVICE COMMUNICATION USING A BROADCAST TYPE MESSAGE

(71) Applicant: Telefonaktiebolaget LM Ericsson (publ), Stockholm (SE)

(72) Inventors: Qianxi Lu, Beijing (CN); Nadia Brahmi, Hildesheim (DE); Qingyu Miao, Beijing (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 73 days.

(21) Appl. No.: 15/035,727

(22) PCT Filed: Nov. 11, 2013

(86) PCT No.: PCT/CN2013/086894
§ 371 (c)(1),
(2) Date: May 10, 2016

(87) PCT Pub. No.: WO2015/066930
PCT Pub. Date: May 14, 2015

(65) Prior Publication Data
US 2016/0302247 A1 Oct. 13, 2016

(51) Int. Cl.
*H04W 76/14* (2018.01)
*H04W 8/00* (2009.01)
*H04W 84/18* (2009.01)

(52) U.S. Cl.
CPC .......... *H04W 76/14* (2018.02); *H04W 8/005* (2013.01); *H04W 84/18* (2013.01); *Y02D 70/00* (2018.01);
(Continued)

(58) Field of Classification Search
CPC ..... H04W 76/14; H04W 8/005; H04W 84/18; Y02D 70/21; Y02D 70/1226;
(Continued)

(56) References Cited

U.S. PATENT DOCUMENTS 7,774,495 B2   8/2010   Pabla et al.
9,699,767 B2*  7/2017   Adachi ................. H04W 72/04
(Continued)

FOREIGN PATENT DOCUMENTS

CN    101772199 A    7/2010
CN    102905334 A    1/2013
(Continued)

OTHER PUBLICATIONS

International Search Report and Written Opinion of the International Searching Authority, Application No. PCT/CN2013/086894, dated Aug. 11, 2014.
(Continued)

*Primary Examiner* — Omar J Ghowrwal
(74) *Attorney, Agent, or Firm* — Sage Patent Group

(57) ABSTRACT

A communication network for Device-to-Device (D2D) communications via at least one intermediate D2D communication device of the D2D communication network is described. A method is performed by the D2D communication device that includes receiving, from the at least one intermediate D2D communication device, a broadcast type message comprising an identifier of the another D2D communication device. A determination is made, based on the received identifier, whether to connect to the another D2D communication device. A unicast type message comprising the received identifier is sent to the at least one intermediate D2D communication device for connecting the D2D communication device and the D2D communication device to one another. These operations may allow the connection establishment to be performed in a robust, easy, efficient and energy-efficient way.

16 Claims, 6 Drawing Sheets

(52) U.S. Cl.
CPC ...... *Y02D 70/1226* (2018.01); *Y02D 70/1262* (2018.01); *Y02D 70/142* (2018.01); *Y02D 70/21* (2018.01); *Y02D 70/22* (2018.01)

(58) Field of Classification Search
CPC .. Y02D 70/1262; Y02D 70/22; Y02D 70/142; Y02D 70/00
See application file for complete search history.

(56) References Cited

U.S. PATENT DOCUMENTS

| | | | | |
|---|---|---|---|---|
| 2008/0146253 | A1* | 6/2008 | Wentink | H04W 68/02 |
| | | | | 455/458 |
| 2010/0135248 | A1* | 6/2010 | Aramaki | H04W 36/0016 |
| | | | | 370/331 |
| 2011/0271334 | A1* | 11/2011 | Yang | H04L 63/083 |
| | | | | 726/7 |
| 2013/0138792 | A1 | 5/2013 | Preden et al. | |
| 2013/0286963 | A1 | 10/2013 | Zheng et al. | |
| 2014/0179330 | A1 | 6/2014 | Du et al. | |
| 2015/0056987 | A1* | 2/2015 | Li | H04W 8/005 |
| | | | | 455/434 |
| 2015/0080002 | A1* | 3/2015 | Cho | H04W 76/023 |
| | | | | 455/450 |
| 2015/0119088 | A1* | 4/2015 | Lee | H04W 68/02 |
| | | | | 455/458 |
| 2016/0007152 | A1* | 1/2016 | Johnsson | H04W 76/021 |
| | | | | 370/329 |

FOREIGN PATENT DOCUMENTS

| | | |
|---|---|---|
| CN | 103379501 A | 10/2013 |
| WO | 2012/035367 | 3/2012 |
| WO | 2012/174151 | 12/2012 |
| WO | WO 2014/158064 A1 | 10/2014 |

OTHER PUBLICATIONS

3GPP, Technical Specification—"3rd Generation Partnership Project; Technical Specification Group Services and System Aspects; Service requirements for the Evolved Packet System (EPS) (Release 12)", 3GPP TS 22.278 V12.4.0 (Sep. 2013), 45 pp.

3GPP, Technical Report—"3rd Generation Partnership Project; Technical Specification Group Services and System Aspects; Feasibility study for Proximity Services (ProSe) (Release 12)", 3GPP TR 22.803 V12.2.0 (Jun. 2013), 45 pp.

Extended European Search Report, Application No. 13897165.0, dated May 19, 2017, 8 pages.

* cited by examiner

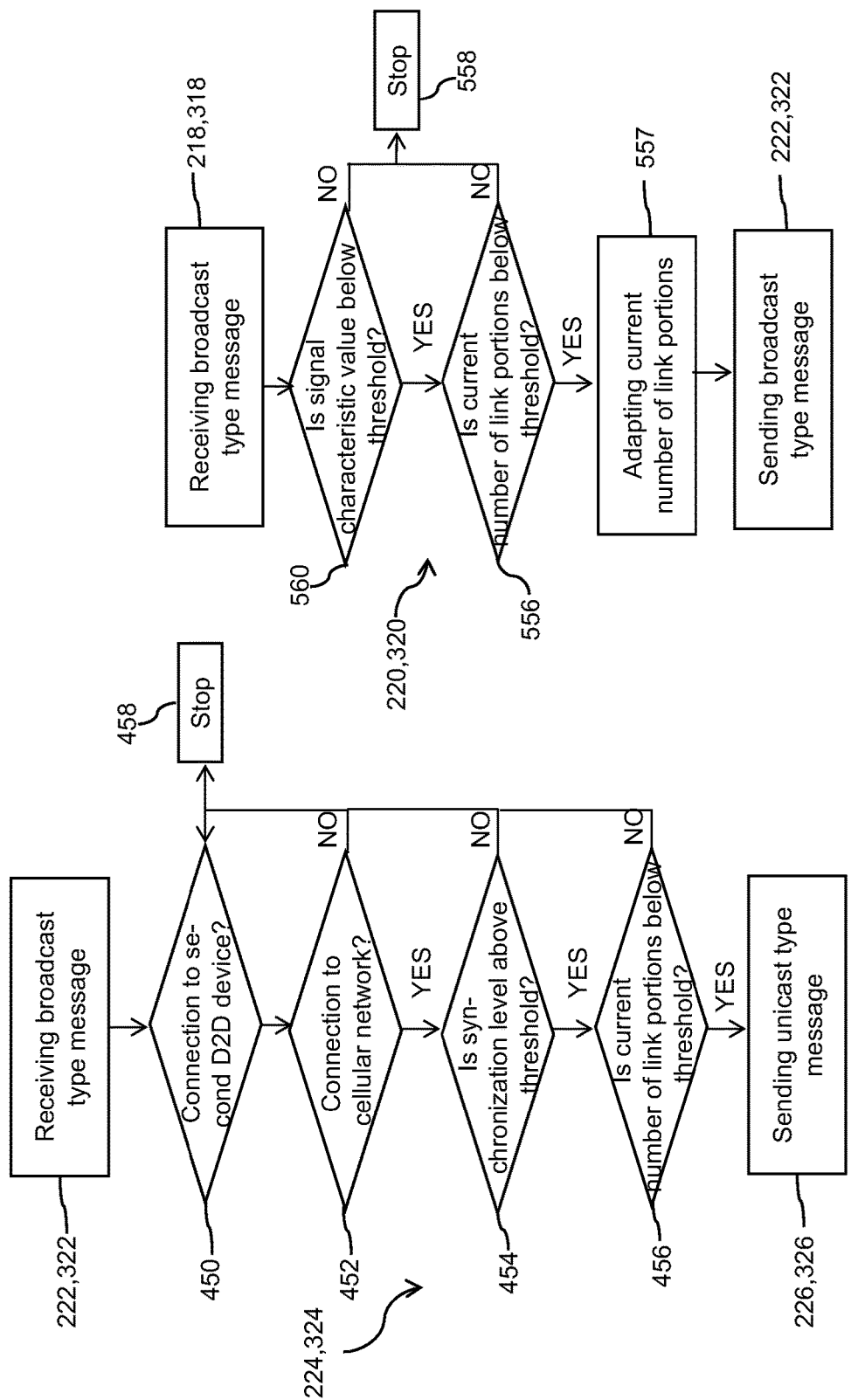

D2D DEVICE COMMUNICATION USING A BROADCAST TYPE MESSAGE

CROSS REFERENCE TO RELATED APPLICATION

This application is a 35 U.S.C. § 371 national stage application of PCT International Application No. PCT/CN2013/086894, filed on Nov. 11, 2013, the disclosure and content of which is incorporated by reference herein in its entirety. The above-referenced PCT International Application was published in the English language as International Publication No. WO 2015/066930 A1 on May 14, 2015.

TECHNICAL FIELD

The present invention relates to an establishment of a multi-hop connection between a device-to-device (D2D) communication device of an established network and a not connected D2D communication device.

BACKGROUND

A D2D communication network is typically used for short-range communication between D2D communication devices, such as terminals, laptops or the like, in order to provide communication within the proximity of each D2D communication device. Thereby, services such as commercial services or location-based social services, can be provided with the D2D communication devices of the D2D communication network in a cost-effective way. Such a D2D communication network represents typically an ad-hoc network forming itself by neighbouring D2D communication devices which may join together to a D2D communication network. The ad-hoc network may also change over time because of the mobility of one or more D2D communication devices. A topology of the D2D communication network may correspond, for example, to a cluster comprising a cluster master or cluster head and one or more cluster slaves. The cluster master may provide, for the cluster, among others, functionalities such as synchronization of itself and the cluster slaves with respect to a synchronization source, radio resource management within the D2D communication network and controlling the creation of connection links between the D2D communication devices. Cluster slaves can provide, for example, a coverage extension of the D2D communication network and may operate in accordance with control instructions of the cluster master. The D2D communication network can be a stand-alone network or can be interconnected with a cellular communication network, for example a radio access network. In the latter option, the cluster master can be embodied as an access node of the cellular communication network. For example, Long Term Evolution (LTE) may represent a typical example of a radio access technology in a radio access network interconnected with a D2D communication network with an associated LTE access node, an eNodeB, performing link setup between the D2D communication devices of a D2D communication network and allocating resources for the connection link. A D2D communication network may also offer access to cellular communication networks for example via the cluster master or a further D2D communication device which is connectable to the cellular communication network.

In security relevant scenarios in which an availability of the cellular communication network may break down or may be not available for other reasons and communication over larger distances may still be needed, multi-hop connections between D2D communication devices via one or more intermediate D2D communication devices may be desired.

SUMMARY

It is an object of the invention to provide measures with which a connection between a D2D communication device not being part of an established D2D communication network and a D2D communication device of the D2D communication network via one or more intermediate D2D communication devices of the D2D communication network can be established to one another in a robust, easy, efficient and energy-efficient way.

The object is solved by methods, D2D communication devices, a communication system, computer programs, and computer program products according to the independent claims.

According to a first exemplary aspect of the invention, a method for connecting a D2D communication device being not part of an established D2D communication network and another D2D communication device of the D2D communication network to one another via at least one intermediate D2D communication device of the D2D communication network is provided. The method is performed by the D2D communication device and comprises receiving, from the at least one intermediate D2D communication device, a broadcast type message comprising an identifier of the another D2D communication device. The method comprises determining, based on the received identifier, whether to connect to the another D2D communication device, and sending an unicast type message comprising the received identifier to the at least one intermediate D2D communication device for connecting the D2D communication device and the another D2D communication device to one another.

According to a second exemplary aspect of the invention, a method for connecting a D2D communication device being not part of an established D2D communication network and another D2D communication device of the D2D communication network to one another via at least one intermediate D2D communication device of the D2D communication network is provided. The method is performed by the at least one intermediate D2D communication device and comprises sending, to the D2D communication device, a broadcast type message comprising an identifier of the another D2D communication device. The method comprises receiving, from the D2D communication device, an unicast type message comprising the identifier of the another D2D communication device, and relaying the unicast type message comprising the identifier to the another D2D communication device for connecting the D2D communication device and the another D2D communication device to one another.

According to a third exemplary aspect of the invention, a method for connecting a D2D communication device being not part of an established D2D communication network and another D2D communication device of the D2D communication network to one another via at least one intermediate D2D communication device of the D2D communication network is provided. The method is performed by the another D2D communication device and comprises receiving, from the at least one intermediate D2D communication device, an unicast type message comprising an identifier of the another D2D communication device for connecting the D2D communication device and the another D2D communication device to one another.

According to a fourth exemplary aspect of the invention, a D2D communication device for connecting itself and another D2D communication device of an established D2D communication network to one another via at least one intermediate D2D communication device of the D2D communication network is provided. The D2D communication device is not part of the D2D communication network and comprises at least one interface for connecting to the another D2D communication device, at least one processor, and a memory comprising instructions to be executed by the at least one processor. Thereby the D2D communication device is adapted to receive, from the at least one intermediate D2D communication device, a broadcast type message comprising an identifier of the another D2D communication device, determine, based on the received identifier, whether to connect to the another D2D communication device, and to send an unicast type message comprising the received identifier to the at least one intermediate D2D communication device for connecting itself and the another D2D communication device to one another.

According to a fifth exemplary aspect of the invention, an intermediate D2D communication device for an established D2D communication network and for connecting a D2D communication device being not part of the D2D communication network and another D2D communication device of the D2D communication network to one another via at least itself is provided. The intermediate D2D communication device comprises at least one interface for connecting to the D2D communication device and/or the another D2D communication device, at least one processor, and a memory comprising instructions to be executed by the at least one processor. Thereby the intermediate D2D communication device is adapted to send, to the D2D communication device, a broadcast type message comprising an identifier of the another D2D communication device, receive, from the D2D communication device, an unicast type message comprising the identifier of the another D2D communication device, and to relay the unicast type message comprising the identifier to the another D2D communication device for connecting the D2D communication device and the another D2D communication device to one another.

According to a sixth exemplary aspect of the invention, a D2D communication device for an established D2D communication network and for connecting another D2D communication device being not part of the D2D communication network and itself to one another via at least one intermediate D2D communication device of the D2D communication network is provided. The D2D communication device comprises at least one interface for connecting to the another D2D communication device, at least one processor, and a memory comprising instructions to be executed by the at least one processor. Thereby the D2D communication device is adapted to receive, from the at least one intermediate D2D communication device, an unicast type message comprising an identifier of itself for connecting the another D2D communication device and itself to one another.

According to a seventh exemplary aspect of the invention, a communication system for connecting a D2D communication device being not part of an established D2D communication network and another D2D communication device of the D2D communication network to one another via the least one intermediate D2D communication device of the D2D communication network is provided. The communication system comprises at least one of the D2D communication device according to the fourth exemplary aspect, the at least one intermediate D2D communication device according to the fifth exemplary aspect, and the another D2D communication device according to the sixth exemplary aspect.

According to an eighth exemplary aspect of the invention, a computer program is provided. The computer program, when being executed by at least one processor of a D2D communication device, causes the D2D communication device to perform a method according to the first, second or third exemplary aspect.

According to a ninth exemplary aspect of the invention, a computer program product is provided. The computer program product comprises program code to be executed by at least one processor of a D2D communication device. Thereby the D2D communication device is caused to perform a method according to the first, second or third exemplary aspect.

BRIEF DESCRIPTION OF THE DRAWINGS

FIG. 4 is a flow chart schematically illustrating a step of determining, by the D2D communication device of FIG. 2 or 3, whether to connect to the another D2D communication device according to an embodiment of the invention.

FIG. 5 is a flow chart schematically illustrating a step of determining, by the at least one intermediate D2D communication device of FIG. 2 or 3, whether to relay the broadcast type message to the D2D communication device according to an embodiment of the invention.

DETAILED DESCRIPTION OF EMBODIMENTS

Figure 1:
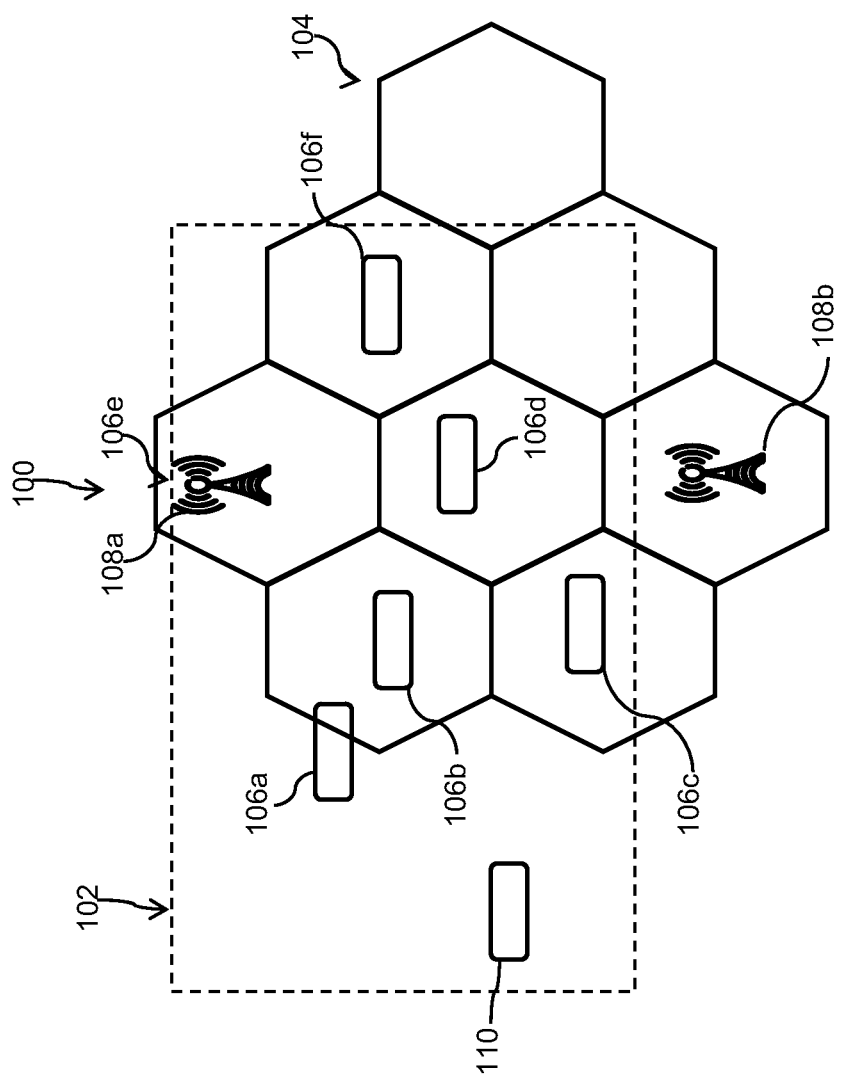
FIG. 1 is a block diagram schematically illustrating a D2D communication scenario in which concepts according to embodiments of the invention are applicable.

It is noted that similar or identical elements or steps in the figures are referenced by the same reference numeral or by reference numerals which are only different within the first digit.

In the following, concepts according to the exemplary aspects of the invention will be explained in more detail. These concepts relate to connecting a stand-alone D2D communication device which might not be part of or connected to a particular established D2D communication network and another D2D communication device of the particular D2D communication network to one another in a multi-hop way, i.e. via one or more intermediate D2D communication devices of the D2D communication network. In this respect, the term "established D2D communication network" may particularly denote a communication network formed by at least two D2D communication devices being connected to one another, for example by means of a respective connection link. The not connected D2D communication device may be part of a further D2D communication network which may be distinct from the particular D2D communication network and/or may be connected to a cellular communication network. Communication within the D2D communication network may be based on a short-range technology and/or may be based on, for example, ad-hoc Wireless Local Network (WLAN) according to IEEE 802.11 standard or LTE D2D. The not connected D2D communication device may be embodied as a user equipment, for example as a terminal, laptop or PDA, but might not be embodied as a node of a cellular communication network.

In order to establish the connection between the D2D communication device and the another D2D communication device, at least one intermediate D2D communication device may send a broadcast type message including an identifier of the another D2D communication device to its proximity. The term "identifier" may particularly denote any kind of identification information which may uniquely identify an individual D2D communication device, such as a message flag or the like. The term "broadcast type message" may particularly denote a message which may be sent to a surrounding of a respective message sender without having a specified recipient.

Hence, a broadcast type message can be received by multiple different recipients. Therefore the D2D communication device can be, as seen from a perspective of the D2D communication network, accordingly discovered in that the D2D communication device may receive the broadcast type message.

The D2D communication device may employ the identifier received in the broadcast type message in order to determine whether to join the D2D communication network by connecting to the another D2D communication device. The D2D communication device may send an unicast type communication message, particularly exclusively, to the intermediate D2D communication device from which the broadcast type communication message has been received. The term "unicast type message" may particularly denote a message which may be addressed to and therefore received by one recipient. The identifier of the another D2D communication device may be also included in the unicast type message, in order to provide address information of the another D2D communication device for routing purposes. Here, the D2D communication devices being in the routing path of the broadcast type message may remain in the routing path for the unicast type message in that the involved D2D communication devices may return the unicast type message to the D2D communication device from which previously the broadcast type message may have been received. In this respect, the term "relaying" may particularly denote that a D2D communication device relaying a message may stay in a communication path of a communication associated with the message.

In particular, a typical kind of communication within the D2D communication network may be reemployed for the connection establishment while the D2D communication device not having joined the D2D communication network may be capable of using its typical way of communication. Further, a routing path for the connection establishment may be identifiable in an easy and robust way by routing the unicast type message to the respective origin of the respective received broadcast type message. Including one or more intermediate D2D communication devices in a connection link between the D2D communication device and the another D2D communication device may cause shorter link portions between neighbouring D2D communication devices compared to a direct connection between the D2D communication device and the another D2D communication device without an intermediate D2D communication device in between, whereby an energy efficiency per device and therefore an energy efficiency associated with the connection establishment may be small. In total, the connection establishment between the D2D communication device and the another D2D communication device may cause a coverage extension of the D2D communication network and may be performed in an easy, efficient, robust and energy-efficient way.

Next, further exemplary embodiments of the method performed by the D2D communication device will be explained. These embodiments also apply to the other methods, the D2D communication devices, the communication system, the computer programs, and the computer program products.

In particular, the identifier of the another D2D communication network included in the broadcast type message and/or in the unicast type message may comprise or may be embodied as a Temporary Mobile Subscriber Identity (S-TMSI), International Mobile Subscriber Identity (IMSI) or a Radio Network Temporary Identifier (RNTI).

The broadcast type message may further comprise identifiers of further D2D communication devices of the D2D communication network, and the step of determining may be further based on the received identifiers of the further D2D communication devices. For example, the identifiers included in the broadcast type message may be arranged in a list. The identifier of one or more of the further D2D communication devices may comprise or may be embodied as a respective S-TMSI, IMSI or RNTI. Further, the identifiers of the D2D communication device and the further D2D communication devices may be of an identical or different type. The identifiers may relate to active D2D communication devices in the D2D communication network and optionally to idle D2D communication devices in the D2D communication network, hence particularly all D2D communication devices in the D2D communication network. In this respect, the term "active D2D communication device" may particularly denote a D2D communication device being connected to the D2D communication network, for example via a Radio Resource Control (RRC) connection. Optionally, an active D2D communication device may perform a communication in terms of, for example, a voice call, browsing, being able to receive a voice call. The term "idle D2D communication device" may particularly denote a D2D communication device being associated with the D2D communication network but being not actively connected to the D2D communication network, for example via the RRC connection. For example an idle D2D communication might not perform a communication as described for an active D2D communication device. This measure may allow to provide the D2D communication device with assistance information for easily identifying a desired communication peer in the D2D communication network and easily initiating to establish the connection to the D2D communication network.

The broadcast type message may be configured as a paging request and may further comprise an identifier of the D2D communication device, wherein the unicast type message may be configured as a paging response and may further comprise the identifier of the D2D communication device. This measure may enable a connection establishment from the D2D communication network to a D2D communication device not part of the D2D communication network in an easy and efficient manner.

In particular, the unicast type message may be configured as a connection establishment request and may further comprise the identifier of the D2D communication device. The method may further comprise, receiving, by the D2D communication network, an unicast type message configured as a connection establishment response from the at least one intermediate D2D communication device. The connection establishment response may be sent from the another D2D communication device and may comprise the identifier of D2D communication device and/or the identifier of the another D2D communication device. At least one of the two aforementioned identifiers may be embodied as a S-TMSI, IMSI or a RNTI.

In particular, the identifier of the another D2D communication device and/or of the D2D communication device included in at least one of the paging response, paging request, connection establishment request and connection establishment response may comprise or may be configured as a S-TMSI or IMSI of the respective D2D communication device.

In particular, the identifier of D2D communication device may be identically configured in the paging request and the paging response or in the connection establishment request and connection establishment response. For example, the identifier of the D2D communication device may be embodied as the S-TMSI in the paging request and the paging response. Alternatively, the identifier of the D2D communication device may be differently configured in the paging request and the paging response or in the connection establishment request and connection establishment response. For example, the identifier of the D2D communication device may be embodied as the S-TMSI in the paging request and as RNTI in the paging response. Additionally or alternatively, the identifier of another D2D communication device may be identically configured in the paging request and the paging response or in the connection establishment request and connection establishment response. Alternatively, the identifier of the another D2D communication device may be differently configured in the paging request and the paging response or in the connection establishment request and connection establishment response. It is noted that different embodiments of the identifier may be applicable for the D2D communication device and the another D2D communication device. For example, the paging request comprises the S-TMSI of the D2D communication device and the S-TMSI of the another D2D communication device, and the paging response may comprise the RNTI of the D2D communication device and the S-TMSI of the another D2D communication device.

The broadcast type message may comprise availability information associated with the another D2D communication device and indicating an availability of a cellular communication network via the D2D communication network, and the step of determining may be further based on the received availability information. The availability information may comprise, for example, an identifier of the another D2D communication device and/or information indicating that the D2D communication network may be capable of connecting to the cellular communication network.

In both options, the D2D communication device may be informed that the another D2D communication device may act as a bridge to the cellular communication network. Therefore the step of determining whether to connect to the another D2D communication device can be performed in view of a desired communication purpose of the D2D communication device, for example related to obtaining a desired service from the cellular communication network.

The broadcast type message may comprise link portion information indicating a current number of link portions of a connection link to a reference D2D communication device, and the step of determining may comprise determining, based on the link portion information, whether the current number may be below a predefined link portion threshold value, and the step of determining may be in the affirmative, if the current number may be below a predefined link portion threshold value. For example, in a case in which the broadcast type message may comprise the identifier of the another D2D communication device and the further identifiers of the further D2D communication devices, the reference D2D communication device may be embodied as a cluster master of the D2D communication network or as a source of the broadcast type message, for example the another D2D communication device. In a case in which the paging request may be received by the D2D communication device the reference D2D communication device may correspond to the source of paging request, namely the another D2D communication device. Therefore a power consumption per device associated with the established connection may be decreased, since some intermediate D2D communication devices may be involved in the connection establishment and therefore each individual link portion between respective neighbouring D2D communication device in the end-to-end connection link between the D2D communication device and the another D2D communication device may be shorter.

The broadcast type message may comprise synchronization level information of the another D2D communication device. The synchronization level information may indicate a synchronization level of the another D2D communication device with respect to a synchronization source, and the step of determining may be further based on the synchronization level information. For example, the synchronization source may correspond to a device or node adapted to control a synchronization between the D2D communication devices of the D2D communication network and nodes of a cellular communication network, for example an access node like the eNodeB. Therefore, the step of determining may be facilitated in that an easy mechanism for selecting a suitable another D2D communication device as communication partner according to a desired synchronization level of communication may be enabled.

For each D2D communication device, whose identifier may be included in the broadcast type message, the broadcast type message may further comprise at least one of availability information associated with the respective D2D communication device and indicating an availability of a cellular communication network via the D2D communication network, link portion information indicating a current number of link portions of a connection link to a reference D2D communication device, and synchronization level information of the respective D2D communication device, the synchronization level information indicating a synchronization level of the respective D2D communication device with respect to the synchronization source. The step of determining, performed by the D2D communication device and being related to whether to connect to the another D2D communication device, may be further based on at least one of the availability information, the link portion information and the synchronization level information. Therefore, the D2D communication device may easily identify, based on various available information, a suitable communication partner in the D2D communication network.

In particular, the established D2D communication network may comprise a cluster based topology in that there may be provided a cluster master or cluster head and one or more cluster slaves, as for example described in the background section. The another D2D communication device may represent the cluster master or may represent a cluster slave, hence the method may be applicable to various communication scenarios. The cluster based topology may provide for a group of D2D communication devices which may be already connected to one another and may have discovered each other. These connected D2D communication devices may easily broadcast the identifiers of neighbouring D2D communication devices. The D2D connection network may manage a selection of one or more cluster D2D communication devices to broadcast respective messages, for example from time to time, in order to discover until now not connected D2D communication devices which may in turn select the D2D communication network formed by these D2D communication devices or may select the D2D communication to which the particular not connected D2D communication device may want to connect.

At least a part of a communication in the D2D communication network may be based on a radio resource control protocol, for example a Radio Resource Control (RRC) protocol of a network link layer or L3 layer of an Open Systems interconnection Model (OSI). For example, the broadcast type message can be sent by means of RRC signalling, for example as System Information Blocks (SIB) in LTE. For example, the unicast type message can be sent by means of terminal specific RRC signalling in LTE. Additionally or alternatively, at least another part of the communication in the D2D communication network can be based on a radio link controlled protocol, for example a Radio Link Control protocol (RLC), and/or a medium access control protocol, for example a Medium Access Control (MAC) protocol, both of RLC and MAC being sub-layers of a data link layer L2 of the OSI. Additionally or alternatively, at least a further part of the communication in the D2D communication network may also be based a physical layer protocol, for example a Physical Layer Protocol of a L1 layer according to OSI.

The D2D communication network may represent an ad-hoc communication network being controlled by the cellular communication network or an ad-hoc communication network being free of a control by the cellular communication network. Therefore, the D2D communication network may be operated as stand-alone communication network or a communication network underlying the cellular communication network.

Next, further exemplary embodiments of the method performed by the at least one intermediate D2D communication device will be explained. These embodiments also apply to the respective other methods, the D2D communication devices, the communication system, the computer programs and the computer program products.

The step of sending may comprise relaying the broadcast type message comprising the identifier in response to receiving the broadcast type message comprising the identifier, particularly from another intermediate D2D communication device or from the another D2D communication device. Therefore, a typical way of distributing messages within the D2D communication network may be employed such that the connection establishment can be performed in an easy, efficient and robust way.

The method may further comprise determining whether to send the broadcast type message comprising the identifier based on a value of a signal characteristic associated with a received signal, and the step of sending may be performed, if the value is below a predefined signal characteristic threshold value. For example, the received signal may correspond to the broadcast type message received from another D2D communication device or may correspond to instructions received from a cluster master to send the broadcast type message. A metric for the signal characteristic may comprise at least one of a Signal to Interference plus Noise Ratio (SINR), a Reference Signal Receive Power (RSRP) and a Reference Signal Receive Quality (RSRQ).

In particular, in a case in which the at least one intermediate D2D communication device might not have received the broadcast type message prior to its sending, the at least one intermediate D2D communication device may, upon receiving the unicast type message, identify the another D2D communication device as destination based on the identifier of the another D2D communication device included in the unicast type message and may accordingly send the unicast type message to the another D2D communication device.

The method may further comprise determining whether to relay the broadcast type message comprising the identifier based on link portion information included in the received broadcast type message. The link portion may indicate a current number of link portions of a connection link to a reference D2D communication device. The step of relaying may be performed, if the current number of link portions may be below a predefined link portion threshold value.

Both measures related to the aforementioned described determination may enable to use, for example, edge devices or those devices of the D2D communication network being far away for message distribution, in order to provide, in case of the coverage extension of the D2D communication network, a balance between, one the one hand, a power efficiency and, on the other hand, a reduction of unwanted signalling overhead associated with the connection establishment. In particular, a signalling overhead may decrease by decreasing the number of D2D communication devices involved in the communication. A power efficiency of the connection establishment may increase by increasing a number of involved D2D communication devices, since a reduced link portion length between neighbouring D2D communication devices may cause an increase in the power efficiency per involved device.

The method may further comprise adapting the current number of link portions indicated in the link portion information included in the broadcast type message prior to the step of sending. The step of adapting may comprise incrementing the current number by one. Therefore the determination whether to relay the broadcast type message and/or whether to send the unicast type message can be performed based on reliable information.

Next, further exemplary embodiments of the method performed by the another D2D communication device will be explained. These embodiments also apply to the respective other methods, the D2D communication devices, the communication system, the computer programs and the computer program products.

The unicast type message may further comprise an identifier of the D2D communication device. The method may comprise determining, based on the received identifier of the D2D communication device, whether to connect to the D2D communication device, and, sending an unicast type message comprising the received identifier of the D2D communication device to the at least one intermediate D2D communication device.

In particular, the received unicast type message may be configured as a connection establishment request, and the method may comprise, prior to the step of receiving, sending a broadcast type message to the at least one intermediate D2D communication device, wherein the broadcast type message may comprise further identifiers of further D2D communication devices. The broadcast type message may further comprise the availability information, the link portion information and/or the synchronization information, as explained above. The method may further comprise sending a further unicast type message configured as a connection establishment response and comprising the identifier of the D2D communication device and/or the identifier of the another D2D communication device. This measure may be beneficially combined with the embodiment of the another D2D communication device determining, prior to sending the further unicast type message, whether to connect to the D2D communication device.

In particular, the received unicast type message may further comprise link portion information and/or synchronization level information associated with the D2D communication device, as explained above which may be used in the step of determining similarly as described above for the D2D communication device and the at least one intermediate D2D communication device. In these embodiments, the reference D2D communication device for the link portion information may correspond to the D2D communication device and/or the synchronization source may correspond to the cluster master and/or an access node of a cellular communication network.

The received unicast type message may be configured as a paging response, and the method may comprise, prior to the step of receiving, sending a broadcast type message being configured as a paging request to the at least one intermediate D2D communication device, wherein the broadcast type message may comprise an identifier of the D2D communication device.

Referring to FIG. 1, a communication scenario in accordance with an embodiment of the invention will be described in more detail. A corresponding communication system 100 comprises an established D2D communication network 102 and a cellular communication network 104, for example a radio access network, both networks 102, 104 being interconnected to one another via one or more entities common to both networks 102, 104. The D2D communication network 102 is configured as ad-hoc network with a cluster based topology having a cluster master and one or more cluster slaves. The D2D communication network 102 is formed by a plurality of D2D communication devices 106a-106f being embodied as for example, as terminals and/or access nodes of the radio access network 104, respectively. In the described embodiment, the D2D communication device 106e corresponds to the master D2D communication device adapted to control a communication of the slave D2D communication devices 106a-106d. The master D2D communication device 106e is embodied as an access node, but may be also configured as a terminal. The slave D2D communication devices 106a-106d, 106f are embodied as the terminals, but at least one of them can be also embodied as access node. Alternatively, the D2D communication network 102 may comprise equal D2D communication devices 106a-106f instead of the cluster based topology.

The cellular communication network 104 may be embodied as LTE communication network with the access nodes 108a, 108b being embodied as eNodeBs, as Global System for Mobile Communications (GSM) Enhanced Data Rates for GSM Evolution (EDGE) Radio Access Network (GERAN) with access nodes embodied as Base Stations (BS) and/or Base Transceiver Stations (BTS) or as Universal Terrestrial Radio Access Network (UTRAN) with access nodes being embodied as NodeBs and/or Radio Access Network Controllers (RNC). The cellular communication network may additionally comprise a core network connected to the radio access network 104.

A further D2D communication device 110, for example a terminal, may roam within a coverage area of the D2D communication network 102 and the radio access network 104, but is not connected to the D2D communication network 102.

Figure 2:
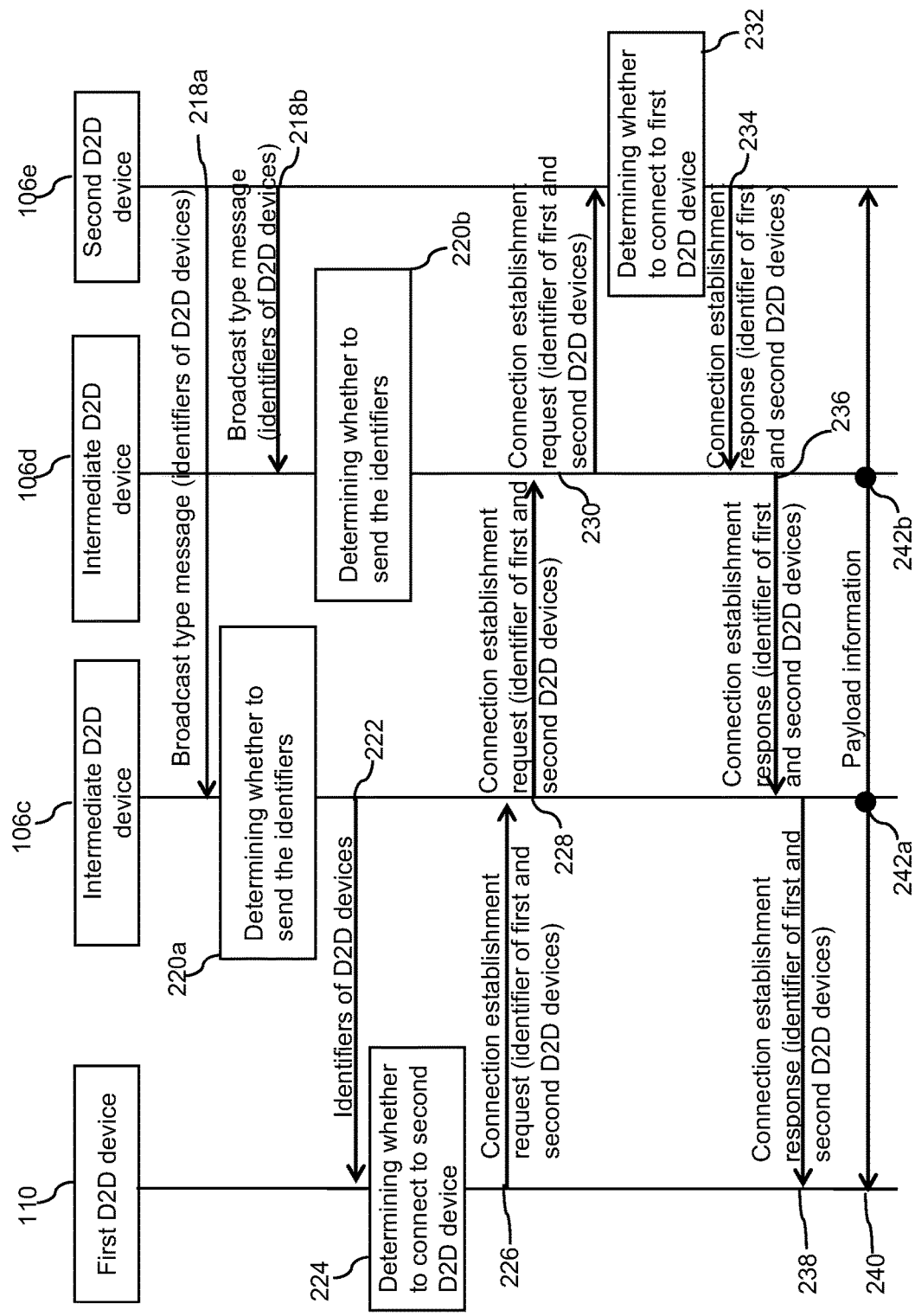
FIG. 2 is a signaling diagram schematically illustrating a method for connecting a D2D communication device being not part of an established D2D communication network and another D2D communication device of the D2D communication network to one another via at least one intermediate D2D communication device of the D2D communication network according to a first embodiment of the invention.
Figure 3:
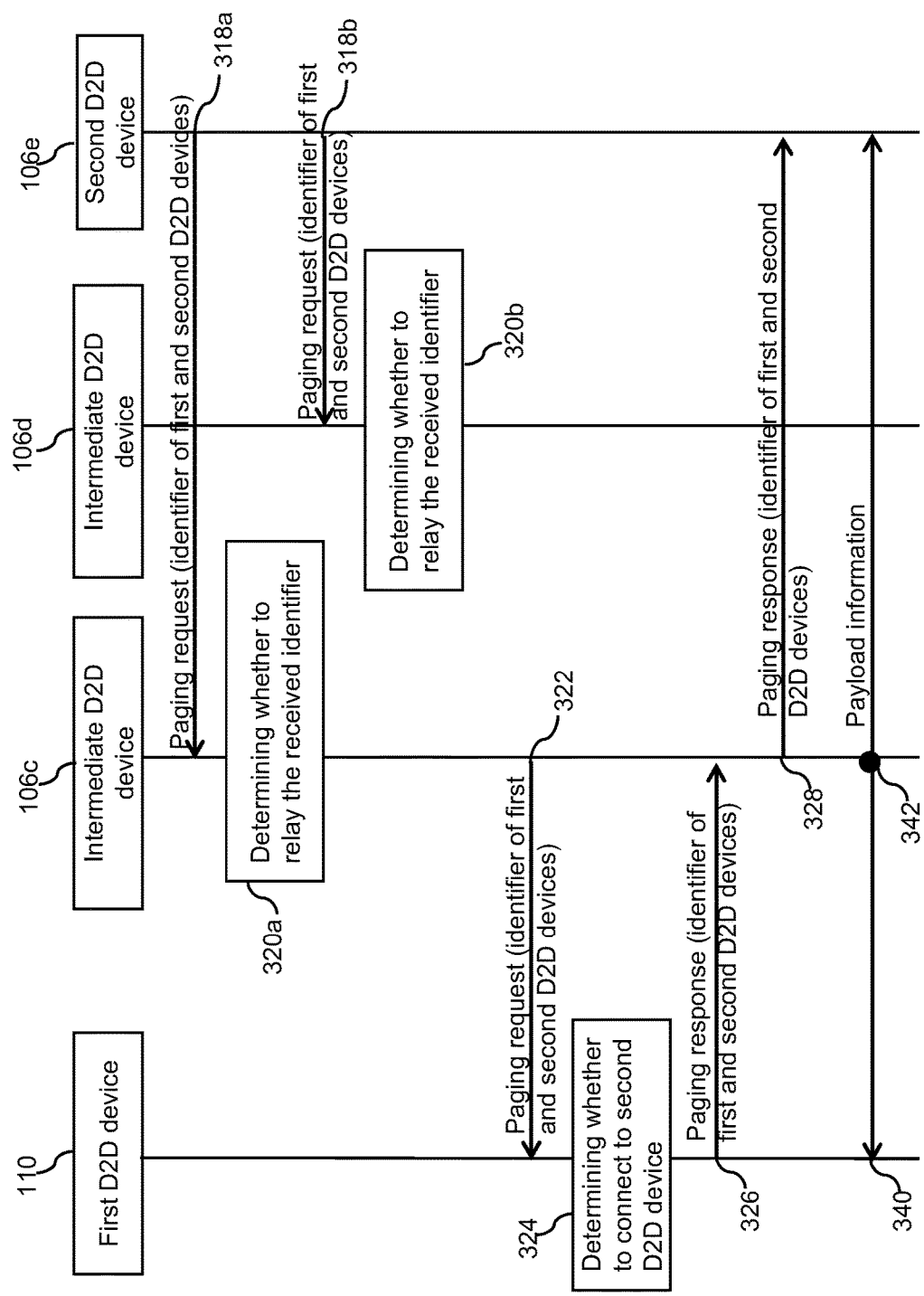
FIG. 3 is a signaling diagram schematically illustrating a method for connecting a D2D communication device being not part of an established D2D communication network and another D2D communication device of the D2D communication network to one another via at least one intermediate D2D communication device of the D2D communication network according to a second embodiment of the invention.

Referring to FIGS. 2, 3, methods for connecting the D2D communication device 110 being not part of the D2D communication network 102, for example the D2D communication device 110, and another D2D communication device of the D2D communication network 102, for example the D2D communication device 106c, via at least one intermediate D2D communication device of the D2D communication network 102, for example the D2D communication devices 106c, 106d, will be explained in more detail. The D2D communication device 110 and the another D2D communication device 106e will be referred to in the following as first and second D2D communication devices 110, 106e for ease of explanation.

In a first optional step 218a, 218b of the method, the second D2D communication device 106e sends a broadcast type message to its proximity, in which message identifiers of active and optionally idle D2D communication devices 106a-106f of the D2D communication network 102 are included. The identifiers may be assembled in a list and may be each embodied as a S-IMSI of the respective D2D communication device 106a-106f. Upon receipt of the broadcast type message, the respective intermediate D2D communication device 106c, 106d determines in a next optional step 220a, 220b whether to relay the broadcast type message including the identifiers to its proximity. In the illustrated embodiment, it is assumed that the determination in the step 220a is in the affirmative and the intermediate D2D communication device 106c relays the broadcast type message, whereas the determination in the step 220b is not in the affirmative and the intermediate D2D communication device 106d does not relay the broadcast type message and the method may stop. The step 220a, 220b can also be performed based on an instruction message received from the cluster master, here the D2D communication device 106e, to disseminate the broadcast type message or based a regular basis without having previously received the broadcast type message in both mentioned embodiments. The determination may then relate to the sending of the broadcast type message instead of to the relaying thereof.

In a step 224, the first D2D communication device 110 determines whether to connect to the second D2D communication device 106e based on the identifiers received in the step 220a. To this end, the first D2D communication device 110 may evaluate the received identifiers and may determine whether to connect to the D2D communication network 102 by accordingly identifying the second D2D communication device 106e, using the identifier thereof, as a suitable connection peer for a connection to be established between the first D2D communication device 110 and the D2D communication network 102. If the first D2D communication device 110 intends to connect to the second D2D communication network 102 via the D2D communication device 106e, the first D2D communication device 110 sends in a further step 226 an unicast type message being configured as a connection establishment request to the intermediate D2D communication device 106c from which the broadcast type message including the identifiers have been received in the step 222. The connection establishment request comprises, in addition to the identifier of the first D2D communication device, an identifier of the second D2D communication device 106e such that the connection establishment request can be relayed by the intermediate D2D communication device 106c in a step 228 to its proper destination. Both identifiers are embodied as the S-TMSI of the respective D2D communication device 110, 106e. Upon receipt of the connection establishment request in the step 228, the intermediate D2D communication device 106d further relays the connection establishment request in a step 230 to the second D2D communication device 106e. In a further step 232, the second D2D communication device 106e determines whether to connect to the first D2D communication device 110 based on the received identifier of the first D2D communication device 110. If the determination is in the affirmative, as is illustrated in FIG. 2, the second D2D communication device 106e sends in a step 234 a corresponding connection establishment response comprising the identifier of the first and second D2D communication devices 110, 106e back to the intermediate D2D communication device 106d from which the connection establishment request has been received. The identifier of the first D2D communication device 110 identifies the destination of the paging establishment response, and the identifier of the second D2D communication device 106e identifies the source of the connection establishment response. Upon receipt of the respective message from the second D2D communication device 106e, the intermediate D2D communication device 106d relays the connection establishment response in a step 236 to the intermediate D2D communication device 106c from which the connection establishment request message has been previously received. Further, in a step 238, the intermediate D2D communication device 106c also relays the connection establishment response to the first D2D communication device 110 accordingly. Upon receipt of the connection establishment response by the first D2D communication device 110, the connection between the first and second D2D communication devices 110, 106e is successfully established, and the first D2D communication device 110 has joined the D2D communication network 102. As indicated by a signaling exchange in the step 240, payload information can be transmitted between the first and second D2D communication devices 110, 106e via the intermediate D2D communication devices 106c, 106d in a relay-like manner. Circles 242a, 242b in FIG. 2 indicate that the intermediate D2D communication devices 106c, 106d may stay in the routing path of the connection link between the first and second D2D communication devices 110, 106e.

In the method illustrated in FIG. 3, a first step 322a, 322b is similar to the step 2218a, 218b. However, the broadcast type message is configured as a paging request and solemnly comprises identifiers of the first and second D2D communication devices 110, 106e, in order to identify a destination and source of the paging request. The identifier of the first D2D communication device 110 is embodied as a S-TMSI and the identifier of the second D2D communication device 106c is embodied as a IMSI. This paging request is received by intermediate D2D communication devices 106c, 106d, respectively. Subsequent steps 320a, 320b are similar to the steps 220a, 220b, and the respective intermediate D2D communication device 106c, 106d accordingly determines, based on the received paging request, whether to send the paging request in a relay like manner to its proximity. Assuming the determination of the step 320a to be in the affirmative, the intermediate D2D communication device 106c relays the received paging request in a broadcast type manner. Assuming the determination of the step 320b to be not in the affirmative, as it is shown for the intermediate D2D communication device 106d, the method may stop and the intermediate D2D communication device 106d does not relay the paging request further.

Upon receipt of the relayed paging request in the step 322, the first D2D communication device 110 determines in a step 324 whether to connect to the second D2D communication device 106e. The step 324 is similar to the step 224. Assuming the determination to be in the affirmative, the first D2D communication device 110 sends in a step 326 an unicast type message configured as a paging response to the intermediate D2D communication device 106c from which the previous paging request has been received in the step 322. The paging response comprises the identifier of the first and second D2D communication devices 110, 106e. The identifier of the first D2D communication device 110 is embodied as a RNTI and the identifier of the second D2D communication device 106c is embodied as the IMSI. Upon receipt of the paging response, the intermediate D2D communication device 106c relays in a step 328 the received paging response to the second D2D communication device 106e from which the paging request has been received in the step 318a. Upon receipt of the paging response by the second D2D communication device 106e in the step 328, a connection between the first and second D2D communication devices 110, 106e is successfully established and the first D2D communication device 110 has joined the D2D communication network 102. In a further step 340, payload information is exchanged between the first and second D2D communication devices 110, 106e in a relay-like manner via the intermediate D2D communication device 106c. A circle 342 indicate that the D2D communication device 106c may stay in the routing path of the connection link between the first and second communication devices 110, 106e.

It is noted that the another D2D communication device 106e may be alternatively embodied as a cluster slave instead as a cluster master. In this embodiment, the cluster master may or might not assist in broadcasting the identifiers in FIG. 2 or 3 and/or may or might not relay the connection establishment related messages in FIG. 2 and the paging response in FIG. 3, respectively.

Figure 6:
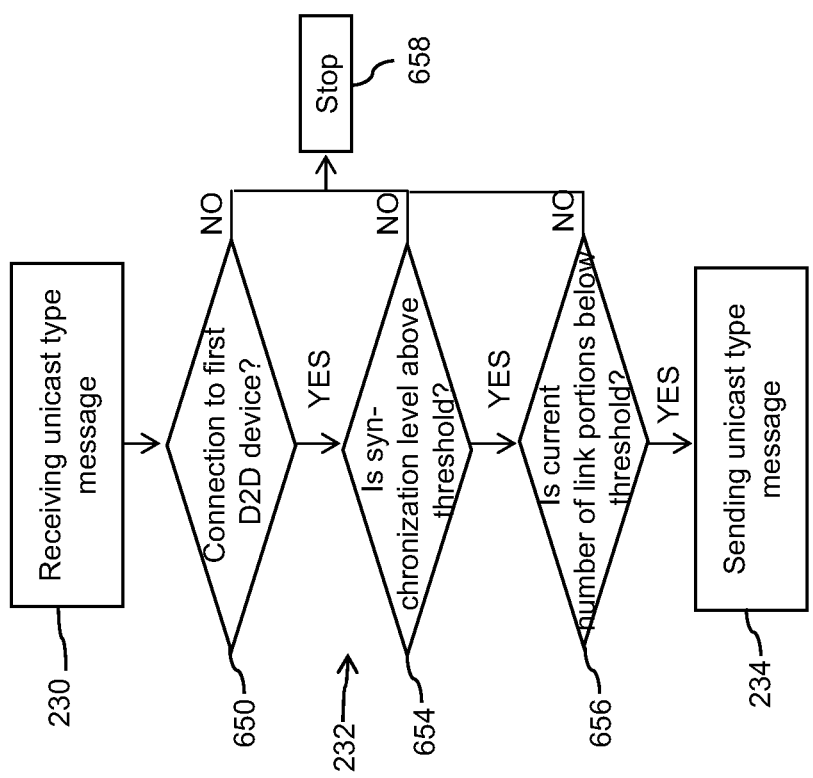
FIG. 6 is a flow chart schematically illustrating a step of determining, by the another D2D communication device of FIG. 2 or 3, whether to connect to the D2D communication device according to an embodiment of the invention.

In the following, the determination steps 224, 324, 220, 320 and 232 of FIGS. 2, 3 will be explained in more detail with reference to FIGS. 4 to 6, respectively.

As illustrated in FIG. 4, the broadcast type message is received in a step 222, 322 by the first D2D communication device 110. The broadcast type message comprises the identifier of the second D2D communication device 106e and optionally at least one of the identifiers of the intermediate D2D communication devices 106a, 106d and the first D2D communication device 110. The broadcast type message may further comprise availability information associated with the second D2D communication device 106e and optionally availability information associated with the intermediate D2D communication devices 106c, 106d, each of which information may indicate an availability of the cellular communication network 104 to be reachable via the respective D2D communication device 106c-106e of the D2D communication network 102. The availability information is embodied as the identifiers of the respective D2D communication device 106c, 1-6e, 106e. It is noted that the identifiers described above and the availability information are both included in the broadcast type message. The broadcast type message may further comprise synchronization level information of the second D2D communication device 106e and optionally of the intermediate D2D communication devices 106c, 106d, each of which information indicates a synchronization level of the respective D2D communication device 106c-106e with respect to a synchronization source, for example the cluster master 106e or one of the access nodes 108a, 108b of the cellular communication network 104. The broadcast type message may also comprise link portion information indicating a current number of link portions of a connection link to a reference D2D communication device. The reference D2D communication may correspond to a source of the broadcast type message, which is in this embodiment the second D2D communication device 106e. The link portion information is assigned to the broadcast type message and is not individual for the D2D communication devices 106c-106e of the D2D communication network 102.

In a first sub-step 450 of the step 224, the first D2D communication device 110 evaluates the received identifiers in the broadcast type message, selects the identifier of the second D2D communication device 106e from the group of identifiers included in the broadcast type message and determines whether to establish a connection to this D2D communication network 102 and in particular to the second D2D communication device 106e or not. Assuming the determination to be in the affirmative, the first D2D communication device 110 evaluates in a further sub-step 452 the availability information associated with the selected second D2D communication device 106e, in order to verify whether a further service from the cellular communication network 102 is available via the second D2D communication device 106e. For example, the latter evaluation may result in the determination to connect to the second D2D communication device 106e, if the first D2D communication device 110 intends to establish a connection link to the cellular communication network 104 or intends to obtain a service from the cellular communication network 104. In a further sub-step 454, the first D2D communication device 110 evaluates the synchronization level information of the selected second D2D communication device 106e, and may, for example determine to connect to the second D2D communication device 106e, if the second D2D communication device 106e may comprise a certain synchronization level above a predefined synchronization level threshold. In a further sub-step 456, the first D2D communication device 110 evaluates the link portion information, in order to determine whether a number of link portions indicated in the link portion information may be below a predefined link portion threshold and therefore the connection to be established may result in an acceptable short routing path towards the second D2D communication device 106e. If the determination is in the affirmative, the step 226, 326 is performed.

Assuming the determination of the step 450-456 to be not in the affirmative, the method may stop, as indicated by a block 458. The first D2D communication device 110 may also iteratively select a further identifier of the group of identifiers received in the step 222 of FIG. 2, and may perform the steps 450-456 for the D2D communication device(s) associated with the further identifier(s). Additionally or alternatively, a result of the determination in the step 224, 324 can be obtained as a combination of the results obtained in the steps 450-456, wherein each result is optionally weighted accordingly accounting for the first D2D communication device 110 to give precedence to one result over the further results of the steps 450-456. A sequence of the sub-steps 450-456 can vary from the described embodiment, and the step 224, 324 may only comprise the sub-step 450 and optionally at least one of the sub-steps 452-456.

In the following, the determination step 220, 320 performed by the intermediate D2D communication device 106c, 106d will be explained in more detail. The step 220, 320 is performed in response to the receipt of the broadcast type message in the step 218, 318. Information included in the broadcast type message can be similar as described in FIG. 4. Alternatively, the step 220 can be performed without being triggered by the step 218. The step 218, 318 comprises a sub-step 560 in which the intermediate D2D communication device 106c, 106d determines whether a value of a signal characteristic associated with a received signal is below a predefined signal characteristic threshold and relays the broadcast type message if the determination is in the affirmative. Thereupon a sub-step 556 is performed which is similar to the sub-step 456. If the determination is in the affirmative, the step 222, 322 is performed. Optionally a step 557 is performed prior to the step 222, 322 in which step the at least one intermediate node 106c, 106d may adapt the current number of link portions in the link portion information of the broadcast type message by incrementing the latter by one. Assuming the determination in the steps 560, 556 to be not in the affirmative, the method may stop, as indicated by a block 558 and the broadcast type message is not sent further. A sequence of the steps 560, 556 can vary from the described embodiment, and the step 220, 230 may only comprise one of the sub-steps 560, 566.

In the following, the determination step 232 performed by the second D2D communication device 106e in response to receiving the connection establishment request in the step 230 will be explained in more detail. The step 232 comprises sub-steps 650, 654, 656 similar to the sub-steps 450, 454, 456 explained with reference to FIG. 4. However, the second D2D communication device 106e determines in the step 650 whether the first D2D communication device 110 is allowed to join the D2D communication network 102. Further, the respective identifier and information relates to the first D2D communication device 110 instead of to the second D2D communication device 106e. Further, the reference D2D communication device from which the current number of link portions indicated in the link portion information is measured corresponds to the first D2D communication device 110. Further, the step 442 of FIG. 4 is omitted in the step 232. In an alternative or additional embodiment, a result of the determination in the step 232 can be obtained as a combination of the results obtained in the steps 650, 654, 656, wherein each result is optionally weighted accordingly accounting for the second D2D communication device 106e to give precedence to one result over the further results of the steps 650, 654, 656. A sequence of the sub-steps 650, 654, 656 can vary from the described embodiment, and the step 232 may comprise only the sub-step 650 and optionally at least one of the sub-steps 654 and 656.

Figure 7:
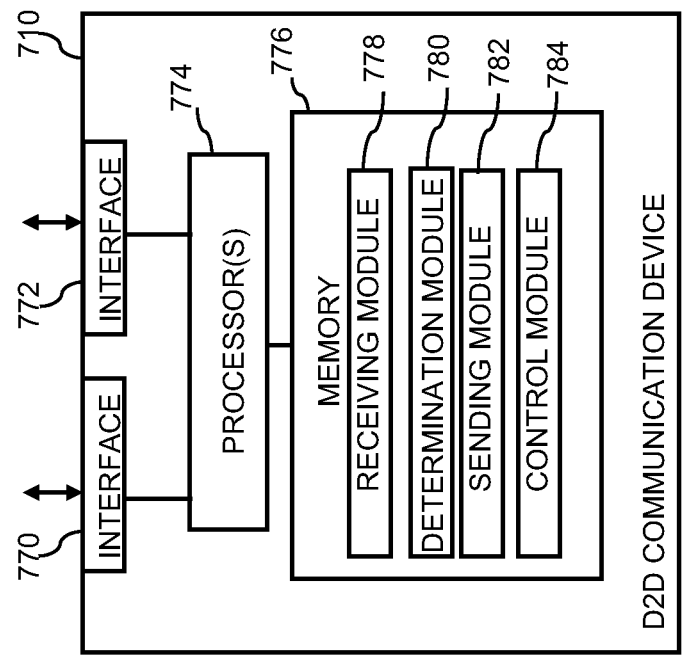
FIG. 7 is a block diagram schematically illustrating a D2D communication device according to an embodiment of the invention.

FIG. 7 illustrates an exemplary implementation of a D2D communication device 710. The D2D communication device 710 may correspond to the D2D communication device 110 described with reference to FIGS. 1 to 6, and may be embodied for example as a terminal.

The D2D communication device 710 is not part of an established D2D communication network, and is adapted for connecting itself and another D2D communication device of the D2D communication network to one another via at least one intermediate D2D communication device of the D2D communication network. To this end, the D2D communication device 710 comprises a first interface 770 for connecting to the another D2D communication device, which interface 770 is, for example, embodied as a radio interface. The D2D communication device 710 may further comprise a second radio interface 772 adapted for communication with a cellular communication network. The D2D communication device 710 may also comprise one interface implementing the functionality of the first and second interfaces 770, 772. One or more processors 774 of the D2D communication device 710 are coupled to the first and second interfaces 770, 772 and a memory 776 of the D2D communication device 710. The memory 766 may include a Read-Only Memory (ROM), for example a flash ROM, a Random-Access Memory (RAM) for example a Dynamic RAM (DRAM) or Static RAM (SRAM), a mass storage, for example a hard-disk or a solid-state disk, or the like.

The memory 776 includes or stores suitable configured instructions, for example program code, to be executed by the one or more processors 774 in order to implement later described functionalities of the D2D communication device 710. Such a functionality will be referred to in the following as a module. It is noted that a module does not represent an individual hardware element of the D2D communication device 710, but rather represent a functionality generated when the one or more processors 776 execute the suitably configured program code. A receiving module 778 may implement functionalities for receiving, from the at least one intermediate D2D communication device, a broadcast type message comprising an identifier of the another D2D communication device. Further, a determination module 780 may implement functionalities for determining, based on the received identifier, whether to connect to the another D2D communication device, and a sending module 782 may implement functionalities related to sending an unicast type message comprising the identifier, for example exclusively, to the at least one intermediate D2D communication device for connecting itself and the another D2D communication device to one another. A further optional control module 784 may implement conventional control functionalities of the D2D communication device 710 when being operated in the D2D communication network and/or the cellular communication network.

The determination module 780 may further implement functionalities explained with reference to FIG. 4, for example functionalities relating performing the above determination based on availability information, link portion information, and synchronization level information. The D2D communication device 710 may also be adapted to perform a method as described above, and may comprise suitable modules for implementing corresponding functionalities. These functionalities can be also implemented by one or more of the above described modules.

Figure 8:
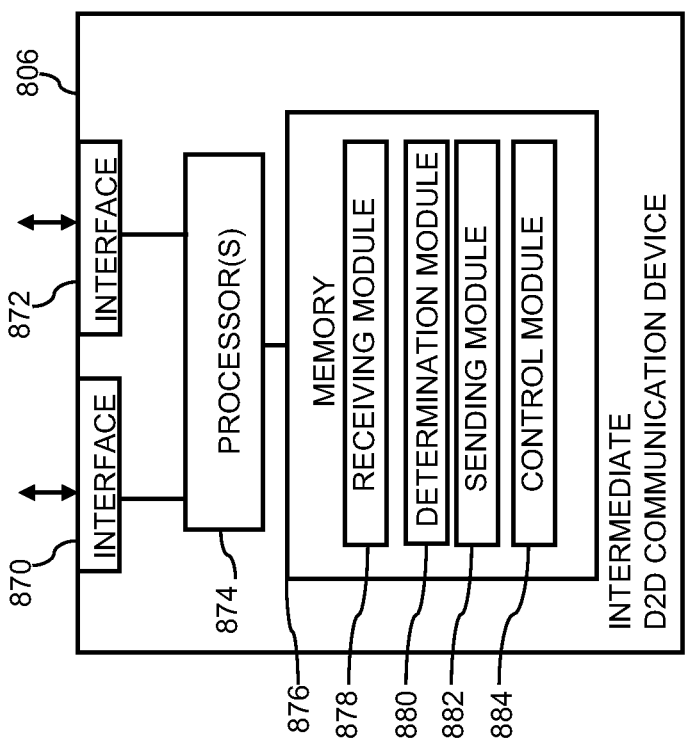
FIG. 8 is a block diagram schematically illustrating an intermediate D2D communication device according to an embodiment of the invention.

FIG. 8 illustrates an exemplary implementation of an intermediate D2D communication device 806. The intermediate D2D communication device 806 may correspond to the D2D communication device 106c, 106d described with reference to FIGS. 1 to 6, and may be embodied for example as a terminal or as a node of a cellular communication network.

The intermediate D2D communication device 806 is configured for an established D2D communication network and is adapted for connecting a D2D communication device being not part of the D2D communication network and another D2D communication device of the D2D communication network to one another via itself and optionally via at least one further intermediate D2D communication device. The D2D communication device 806 comprises a first interface 870 for connecting to the D2D communication device and to another D2D communication device, which interface 870 is, for example, embodied as a radio interface. The D2D communication device 806 may further comprise a second radio interface 872 adapted for communication with a cellular communication network. The D2D communication device 806 may also comprise one interface implementing the functionality of the first and second interfaces 870, 872. One or more processors 874 of the D2D communication device 806 are coupled to the first and second interfaces 870, 872 and a memory 876 of the D2D communication device 806. The memory 866 may include a Read-Only Memory (ROM), for example a flash ROM, a Random-Access Memory (RAM) for example a Dynamic RAM (DRAM) or Static RAM (SRAM), a mass storage, for example a hard-disk or a solid-state disk, or the like.

The memory 876 includes or stores suitable configured instructions, for example program code, to be executed by the one or more processors 874 in order to implement the later described functionalities of the intermediate D2D communication device 806. Such a functionality will be referred to in the following as a module. It is noted that a module does not represent an individual hardware element of the D2D communication device 806, but rather represent a functionality generated when the one or more processors 876 execute the suitably configured program code. A sending module 882 may implement functionalities related to sending to the D2D communication device, a broadcast type message comprising an identifier of the another D2D communication device and a receiving module 878 may implement functionalities related to receiving, from the D2D communication device, an unicast type message comprising the identifier of the another D2D communication device. The sending module 882 may further implement functionalities related to relaying the unicast type message comprising the identifier to the another D2D communication device for connecting the D2D communication device and the another D2D communication device to one another. The program code may also provide for a separate relaying module for implementing the functionalities related to the latter described relaying. A determination module 880 may implement functionalities related to determining whether to send the broadcast type massage comprising the identifier based on a value of a signal characteristic associated with a received signal and/or for determining whether to relay the broadcast type message based on link portion information received in the broadcast type message. The link portion information may indicate a current number of link portions of a connection link to a reference D2D communication device. An optional control module 884 may implement conventional control functionalities of the intermediate D2D communication device 806 when being operated in the D2D communication network and/or the cellular communication network. The sending module 882 may also implement functionalities related to adapt the current number of link portions in the link portion information in the broadcast type message prior to sending the broadcast type message. The D2D communication device 806 may be also adapted to perform a method as described above, and may comprise suitable modules for implementing the corresponding functionalities. These functionalities can be also implemented by one or more of the above described modules.

Figure 9:
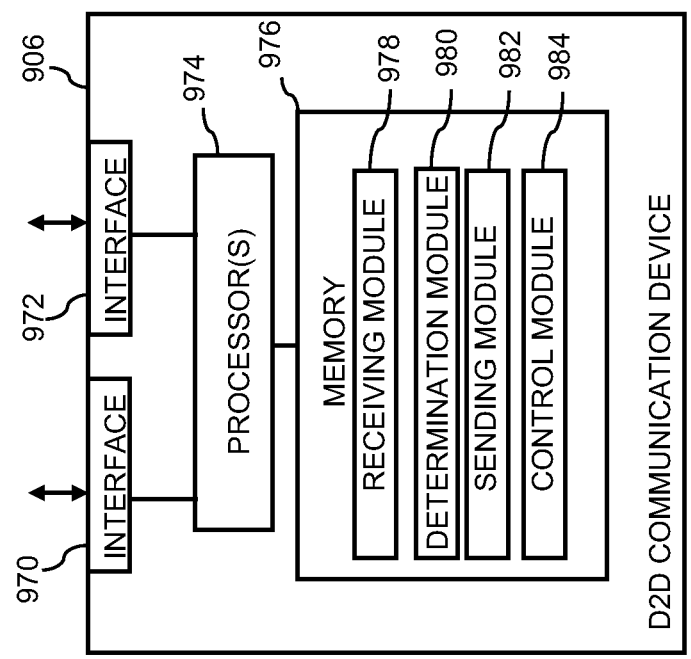
FIG. 9 is a block diagram schematically illustrating another D2D communication device according to an embodiment of the invention.

FIG. 9 illustrates an exemplary implementation of a D2D communication device 906. The intermediate D2D communication device 906 may correspond to the second D2D communication device 106e described with reference to FIGS. 1 to 6, and may be embodied for example as a terminal or a node of a cellular communication network.

The D2D communication device 906 is adapted for an established D2D communication network and is adapted for connecting another D2D communication device being not part of the established D2D communication network and itself via at least one intermediate D2D communication device of the D2D communication network. The D2D communication device 906 comprises a first interface 970 for connecting to the another D2D communication device and to at least one intermediate D2D communication device, which interface 970 is, for example, embodied as a radio interface. The D2D communication device 906 may further comprise a second radio interface 972 adapted for communication with a cellular communication network. The D2D communication device 910 may also comprise one interface implementing the functionality of the first and second interfaces 870, 872. One or more processors 974 of the D2D communication device are coupled to the first and second interfaces 970, 972 and a memory 976 of the D2D communication device 906. The memory 976 may include a Read-Only Memory (ROM), for example a flash ROM, a Random-Access Memory (RAM) for example a Dynamic RAM (DRAM) or Static RAM (SRAM), a mass storage, for example a hard-disk or a solid-state disk, or the like.

The memory 976 includes or stores suitable configured instructions, for example program code, to be executed by the one or more processors 974, in order to implement the later described functionalities of the D2D communication device 906. Such a functionality will be referred to in the following as a module. It is noted that a module does not represent an individual hardware element of the D2D communication device 906, but rather represent a functionality generated when the one or more processors 974 execute the suitably configured program code. A receiving module 978 may implement functionalities related to receiving from the at least one intermediate D2D communication device an unicast type message comprising an identifier of itself for connecting the another D2D communication device and itself to one another. The unicast type message may further comprise an identifier of the another D2D communication device, and an optional determination module 980 may implement functionalities related to determining, based on the received identifier of the another D2D communication device, whether to connect to the another D2D communication device, and an optional sending module 982 may implement functionalities related to sending, to the at least one intermediate D2D communication device, an unicast type message comprising the identifier of the another D2D communication device. The received unicast type message may be configured as a paging response, and the sending module 982 may also implement functionalities related to sending, prior to receiving the unicast message, a broadcast type message being configured as a paging request to the at least one intermediate D2D communication device with the broadcast type message comprising an identifier of the another D2D communication device 906. A further optional control module 984 may implement conventional control functionalities of the D2D communication device 906 when being operated in the D2D communication network and/or the cellular communication network. The D2D communication device 906 may be also adapted to perform a method as described above, and may comprise suitable modules for implementing corresponding functionalities. These functionalities can be also implemented by one or more of the above described modules.

According to some embodiments of the invention, a computer program may be provided. The computer program may comprise instructions or may be embodied in such instructions in order to implement at least one of the above-mentioned modules 778-784, 878-884, 978-984. The computer program causes, when being executed by the one or more processors 774, 874, 974, the D2D communication device 710, 806, 906 to perform the above-described method. The computer program may be provided in a downloadable form or may be stored on a computer program product, for example a disk.

Modifications and other embodiments of the disclosed invention will come to mind to one skilled in the art having the benefit of the teachings presented in the foregoing descriptions and the associated drawings. Therefore, it is to be understood that the embodiments are not to be limited to the specific embodiments disclosed and that modifications and other embodiments are intended to be included within the scope of this disclosure. Although specific terms may be employed herein, they are used in a generic and descriptive sense only and not for purposes of limitation. The description of the invention with reference to LTE may not exclude the described invention being applicable in other communication technologies being different from 3GPP.

What is claimed is:

1. A method for connecting a Device-to-Device (D2D) communication device being not part of an established D2D communication network and another D2D communication device of the D2D communication network to one another via at least one intermediate D2D communication device of the D2D communication network, the method being performed by the D2D communication device and comprising steps of:

receiving, from the at least one intermediate D2D communication device, a broadcast type message comprising an identifier of the another D2D communication device, determining, based on the received identifier, whether to connect to the another D2D communication device, and sending a unicast type message comprising the received identifier to the at least one intermediate D2D communication device for connecting the D2D communication device and the another D2D communication device to one another, wherein the broadcast type message comprises availability information associated with the another D2D communication device and indicating an availability of a cellular communication network via the D2D communication network, wherein the step of determining is further based on the received availability information, wherein the broadcast type message comprises link portion information indicating a current number of link portions of a connection link in the D2D communication network between the D2D communication device and the another D2D communication device, wherein the step of determining is further based on the link portion information.

2. The method according to claim 1, wherein the broadcast type message further comprises identifiers of further D2D communication devices of the D2D communication network, wherein the step of determining is further based on the received identifiers of the further D2D communication devices.

3. The method according to claim 1, wherein the broadcast type message is configured as a paging request and further comprises an identifier of the D2D communication device, wherein the unicast type message is configured as a paging response and further comprises an identifier of the D2D communication device.

4. The method according to claim 1, wherein the broadcast type message comprises link portion information indicating a current number of link portions of a connection link to a reference D2D communication device, wherein the step of determining further comprises determining, based on the link portion information, whether the current number is below a predefined link portion threshold value, and wherein the step of determining is in the affirmative, based on determining that the current number is below the predefined link portion threshold value.

5. The method according to claim 1, wherein the broadcast type message comprises synchronization level information of the another D2D communication device, the synchronization level information indicating a synchronization level of the another D2D communication device with respect to a synchronization source, and wherein the step of determining is further based on the synchronization level information.

6. The method according to claim 1, wherein, for each D2D communication device whose identifier is included in the broadcast type message, the broadcast type message further comprises at least one of:
  availability information associated with the respective D2D communication device and indicating an availability of a cellular communication network via the D2D communication network,
  link portion information indicating a current number of link portions of a connection link to a reference D2D communication device, and
  synchronization level information of the respective D2D communication device, the synchronization level information indicating a synchronization level of the respective D2D communication device with respect to the synchronization source,
  wherein the step of determining is further based on at least one of the availability information, the link portion information, and the synchronization level information.

7. A method for connecting a Device-to-Device (D2D) communication device being not part of an established D2D communication network and another D2D communication device of the D2D communication network to one another via at least one intermediate D2D communication device of the D2D communication network, the method being performed by the at least one intermediate D2D communication device and comprising steps of:
  sending, to the D2D communication device, a broadcast type message comprising an identifier of the another D2D communication device, wherein the broadcast type message comprises availability information associated with the another D2D communication device and indicating an availability of a cellular communication network via the D2D communication network,
  receiving, from the D2D communication device, a unicast type message comprising the identifier of the another D2D communication device, and
  relaying the unicast type message comprising the identifier to the another D2D communication device for connecting the D2D communication device and the another D2D communication device to one another,
  wherein the broadcast type message comprises link portion information indicating a current number of link portions of a connection link in the D2D communication network between the D2D communication device and the another D2D communication device.

8. The method according to claim 7, wherein the step of sending comprises relaying the broadcast type message comprising the identifier in response to receiving the broadcast type message particularly from a further intermediate D2D communication device or from the another D2D communication device.

9. The method according to claim 7, the method comprising:
  determining whether to send the broadcast type message comprising the identifier based on a value of a signal characteristic associated with a received signal,
  wherein the step of sending is performed, based on determining that the value is below a predefined signal characteristic threshold value.

10. The method according to claim 8, the method comprising:
  determining whether to relay the broadcast type message comprising the identifier based on link portion information included in the received broadcast type message, the link portion indicating a current number of link portions of a connection link to a reference D2D communication device,
  wherein the step of relaying is performed, based on determining that the current number of link portions is below a predefined link portion threshold value.

11. The method according to claim 10, the method comprising:
  adapting the current number of link portions indicated in the link portion information included in the broadcast type message prior to the step of sending.

12. A method for connecting a Device-to-Device (D2D) communication device being not part of an established D2D communication network and another D2D communication device of the D2D communication network to one another via at least one intermediate D2D communication device of the D2D communication network, the method being performed by the another D2D communication device and comprising steps of:
  sending, to the at least one intermediate D2D communication device, a broadcast type message comprising an identifier of the another D2D communication device, wherein the broadcast type message comprises availability information associated with the another D2D communication device and indicating an availability of a cellular communication network via the D2D communication network, and
  receiving, from the at least one intermediate D2D communication device, a unicast type message comprising an identifier of the another D2D communication device for connecting the D2D communication device and the another D2D communication device to one another,
  wherein the broadcast type message comprises link portion information indicating a current number of link portions of a connection link in the D2D communication network between the D2D communication device and the another D2D communication device.

13. The method according to claim 12, wherein the unicast type message further comprises an identifier of the D2D communication device, the method comprising:
- determining, based on the received identifier of the D2D communication device, whether to connect to the D2D communication device, and
- sending an unicast type message comprising the received identifier of the D2D communication device to the at least one intermediate D2D communication device.

14. The method according to claim 12, wherein the unicast type message is configured as a paging response, the method comprising:
- prior to the step of receiving, sending the broadcast type message being configured as a paging request to the at least one intermediate D2D communication device, the broadcast type message comprising an identifier of the D2D communication device.

15. The method according to claim 1, wherein the broadcast type message comprises synchronization level information indicating a synchronization level of the another D2D communication device with respect to a synchronization source in the D2D communication network, and
- wherein the step of determining is further based on the synchronization level information.

16. The method according to claim 7, wherein the broadcast type message comprises synchronization level information indicating a synchronization level of the another D2D communication device with respect to a synchronization source in the D2D communication network.

* * * * *